United States Patent
Campbell et al.

(10) Patent No.: US 8,722,284 B2
(45) Date of Patent: May 13, 2014

(54) SYNTHESIS OF STABLE AND DURABLE CATALYST COMPOSITION FOR FUEL CELL

(75) Inventors: Stephen A. Campbell, Maple Ridge (CA); Natalia Kremliakova, Burnaby (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 82 days.

(21) Appl. No.: 13/499,068

(22) PCT Filed: Sep. 30, 2010

(86) PCT No.: PCT/EP2010/005955
§ 371 (c)(1),
(2), (4) Date: Apr. 12, 2012

(87) PCT Pub. No.: WO2011/038907
PCT Pub. Date: Apr. 7, 2011

(65) Prior Publication Data
US 2012/0189943 A1     Jul. 26, 2012

Related U.S. Application Data

(60) Provisional application No. 61/247,380, filed on Sep. 30, 2009.

(51) Int. Cl.
*H01M 4/04*     (2006.01)

(52) U.S. Cl.
USPC ......................................................... 429/524

(58) Field of Classification Search
None
See application file for complete search history.

(56) References Cited

U.S. PATENT DOCUMENTS

| 5,183,713 | A | 2/1993 | Kunz |
| 2008/0233465 | A1 | 9/2008 | Mizutani |
| 2010/0068591 | A1 | 3/2010 | Kawamura |

FOREIGN PATENT DOCUMENTS

| WO | 0148839 A2 | 7/2001 |
| WO | 2009091025 A1 | 7/2009 |

*Primary Examiner* — Patrick Ryan
*Assistant Examiner* — Wyatt McConnell
(74) *Attorney, Agent, or Firm* — Patent Central LLC; Stephan A. Pendorf (57) ABSTRACT

Provided is a catalyst composition comprising an intermetallic phase comprising Pt and a metal selected from either Nb or Ta, and a dioxide of the metal. Also provided is a low temperature method for making such compositions that results in the formation of intermetallic phase with small crystallite size and thus greater mass activity. In particular, a $Pt_3Nb$—$NbO_2$ catalyst composition can be prepared that is useful as a fuel cell catalyst and offers a very stable chemical substrate along with good electrode activity and remarkable durability. The use of $Pt_3Nb$—$NbO_2$ can considerably prolong fuel cell lifetime by reducing Pt dissolution levels and subsequent voltage losses. The $Pt_3Nb$—$NbO_2$ can be used in the cathode and/or anode of a fuel cell.

21 Claims, 8 Drawing Sheets

SYNTHESIS OF STABLE AND DURABLE CATALYST COMPOSITION FOR FUEL CELL

FIELD OF THE INVENTION

The present invention pertains to catalyst compositions comprising a Pt based intermetallic phase and a metal dioxide. The catalyst compositions are particularly useful as electrodes in fuel cells.

BACKGROUND

The polymer electrolyte membrane fuel cell (PEMFC) is a prime candidate for vehicle and other mobile applications. Much research has been directed to the catalysts used. Platinum (Pt) is by far the most prominent and effective material used as a PEM system catalyst. Areas in which improvement is needed are the catalyst activity, the durability and the stability of the fuel cell catalyst During polymer electrolyte membrane fuel cell operation, the platinum of Pt catalysts eventually dissolves, re-deposits in the membrane, and agglomerates, resulting in electrochemical surface area losses, thereby decreasing catalyst activity. The fuel cell industry, especially the automotive fuel cell industry, demands active and stable cathode catalysts.

Research into catalysts for fuel cells has been ongoing. For example, Miguel Cruz Quinones at the Cornell Center for Materials Research investigated new intermetallic compounds for fuel cell anodes using cyclic voltammetry. Among the most promising ordered intermetallic phases were $Pt_3Ta$, $Pt_2Ta$, $Pt_3Ti$ and $Pt_3Nb$.

Others have also investigated improved catalysts for fuel cell electrodes. In WO2009/091025, an improved electrode catalyst is disclosed comprising platinum or platinum alloy and a metal oxide such as tantalum oxide and/or niobium oxide. In US2010068591, fuel cell electrodes comprising $Nb_2O_5/Pt/C$ catalyst are disclosed.

Nevertheless, a more stable and durable catalyst for a fuel cell electrode is needed, and especially one that can be easily synthesized.

SUMMARY

Provided is a catalyst composition for a fuel cell which comprises an intermetallic phase comprising platinum and a metal from the group consisting of niobium and tantalum, along with a dioxide of that metal. The use of such compositions as a fuel cell catalyst offers a very stable chemical substrate that demonstrates higher or comparable cathode and anode activity to Pt catalysts, higher specific activity and remarkable durability. The use of the compositions can considerably prolong fuel cell lifetime by reducing Pt dissolution levels and subsequent voltage bases. The catalyst compositions can be used in either the cathode and/or the anode of a fuel cell, and particularly as electrodes in polymer electrolyte membrane fuel cells.

In an exemplary catalyst composition, the metal is Nb and the catalyst composition is $Pt_3Nb$—$NbO_2$. The structure of the $Pt_3Nb$ intermetallic phase in this composition is orthorhombic with lattice parameters a=4.5700 Å, b=5.5400 Å, and c=4.8800 Å.

A low temperature method of synthesis has been discovered that enables the platinum-metal intermetallic phase to be made with relatively small crystallite sizes. Consequently, the composition is characterized by a relatively high catalytic activity per unit weight. Further, the method provides for intimate contact between the intermetallic phase and the dioxide support, thereby providing for strong intermetallic phase interaction with the dioxide. The average crystallite size of the intermetallic phase (as determined from line broadening in x-ray diffraction patterns) can be less than 35 nm, and in particular less than 15 nm.

The method of making the catalyst composition generally comprises initially preparing a thermolysis mixture comprising a salt of the metal wherein the metal is in the +5 valence state, a Pt compound, and a basic salt selected to decompose into gaseous byproducts at a thermolysis temperature. The thermolysis mixture is heated in a reducing atmosphere to the thermolysis temperature in which the thermolysis temperature is less than 900° C.

The method can involve grinding the thermolysis mixture before heating it. A suitable reducing atmosphere for the thermolysis comprises hydrogen and an inert gas (such as argon). And a suitable thermolysis temperature is about 800° C.

In one embodiment, an initial mixture can be prepared comprising the salt of the metal and the basic salt, and then this initial mixture is heated in an ambient atmosphere to a temperature below the thermolysis temperature. The initial mixture here can comprise amorphous metal oxide. Also here, the Pt compound can be added to the initial mixture after heating the initial mixture. This thereby prepares the thermolysis mixture.

To make niobium based catalyst compositions, the salt of the metal can be niobium oxalate, niobium chloride, or the like.

In the method, the Pt compound can be tetraamine platinum(II) nitrate, tetraamine platinum(II) chloride hydrate, platinum(II) chloride monohydrate, platinum acetylacetonate, diiminedinitrito platinum(II) or dihydrogenhexachloroplatinate(IV) hexahydrate. And the basic salt can be ammonium bicarbonate, ammonium carbonate, ammonium acetate, ammonium oxalate, ammonium sulfate, or ammonium hydroxide.

In particular, when the catalyst composition to be made is $Pt_3Nb$—$NbO_2$, the salt of the metal can be niobium oxalate, the Pt compound can be tetraamine platinum(II) nitrate or dihydrogenhexachloroplatinate(IV) hexahydrate, and the basic salt can be ammonium bicarbonate respectively. Here, the atomic ratio of Pt to Nb in the thermolysis mixture is greater than or equal to 0.4.

DETAILED DESCRIPTION

The catalyst compositions of the present invention are novel phase combinations comprised of a dispersion of an intermetallic phase comprising Pt and either Nb or Ta metal on a dioxide of the metal. Surprisingly, the intermetallic phase and the catalyst compositions can be synthesized using a simple, relatively low temperature procedure. Hitherto, it was believed that low temperature synthesis of such intermetallic phases was not known. A consequence of using a higher temperature synthesis method is that it results in the formation of large crystalline regions of the intermetallic. On the other hand, the low temperature method can provide intermetallic phase material having a relatively small average crystallite size and hence providing a high catalytic activity per unit weight. Further, the synthesis procedure provides for the intermetallic phase being in intimate contact with the metal dioxide support and thus provides for strong intermetallic phase interaction with the dioxide.

An exemplary catalyst composition is $Pt_3Nb$—$NbO_2$ where Nb is the metal forming the intermetallic phase with Pt. Ta is chemically similar to Nb and may also be used. (Vanadium on the other hand is not considered suitable in practice because it is not stable in an acidic fuel cell environment and is toxic.)

The method of making such catalyst compositions generally involves preparing a thermolysis mixture comprising suitable choices of a salt of the metal wherein the metal is in its highest oxidation state, e.g. the +5 valence state, a Pt compound, and a basic salt selected to decompose into gaseous byproducts at a thermolysis temperature (in order not to leave behind unwanted reaction products after synthesis). The thermolysis mixture is then heated in a reducing atmosphere to a thermolysis temperature less than 900° C.

As illustrated in the Examples below, a thermolysis mixture for making $Pt_3Nb$—$NbO_2$ can be prepared by grinding $Nb(HC_2O_4)_5 \cdot 6H_2O$ and $Pt(NH_3)_4 (NO_2)_2$ together in the presence of $NH_4HCO_3$, and thereby obtaining an intimate mixture. An atomic ratio of Pt to Nb is employed that is greater than or equal to 0.4 in order to obtain the desired product. The resulting thermolysis powder mixture can then be heated in a reducing atmosphere to provide the final product. The reducing atmosphere can comprise, e.g., $H_2$ and any inert gas such as nitrogen or argon. The $Pt_3Nb$—$NbO_2$ can be obtained by heating to a temperature of about 800° C. for a sufficient time. Generally, about 1 hour is sufficient. The material can then be cooled.

This simple relatively low temperature heating procedure in a reducing atmosphere has been found to allow the Pt to alloy with Nb forming $Pt_3Nb$ intermetallic phase and $NbO_x$ to convert to crystalline $NbO_2$ to form the $Pt_3Nb$—$NbO_2$ catalyst composition.

In one embodiment, an initial mixture can be prepared comprising the salt of the metal and the basic salt, and then this initial mixture can be heated to a temperature below the thermolysis temperature (e.g. 400° C. for about 1 hour) in an argon or nitrogen atmosphere (a reducing atmosphere may not be not necessary at this stage). An amorphous metal oxide may first be formed in this way. Then, the Pt compound can be added to this initial mixture comprising amorphous metal oxide to make the thermolysis mixture ready for final heating.

In general, to make niobium based catalyst compositions, the salt of the metal can be niobium oxalate or niobium chloride. To make tantalum based catalyst compositions, equivalent tantalum salts may be employed.

In the general method, the Pt compound can be tetraamine platinum(II) nitrate, tetraamine platinum(II) chloride hydrate, platinum(II) chloride monohydrate, platinum acetylacetonate, diiminedinitrito platinum(II) or dihydrogenhexachloroplatinate(IV) hexahydrate. And the basic salt can be ammonium bicarbonate, ammonium carbonate, ammonium acetate, ammonium oxalate, ammonium sulfate, or ammonium hydroxide.

The low temperature catalyst composition product is characterized by both an intermetallic phase and a metal dioxide which both have relatively small crystallite size. And as a consequence, the intermetallic phase has a relatively larger surface area per unit weight and corresponding catalytic activity per unit weight. As illustrated in the Examples to follow, the average crystallite size of the intermetallic phase can be significantly less than 35 nm.

Once the catalyst composition material has been obtained, it can be used as the catalyst for an anode or cathode in a polymer electrolyte membrane fuel cell. Good cathode and anode activity has been observed. It is preferred to use the catalyst as a cathode catalyst.

Generally, the catalyst material is used as a coating on a substrate to form the electrode. The surface or coating of the electrode can be made up entirely of the $Pt_3Nb$—$NbO_2$ catalyst, or mixed with refractory materials such as $TiO_2$ and $ZrO_2$.

The substrate on which the catalyst coating is provided has a sufficient electrical conductivity for the fuel cell, and is preferably carbon based. Graphite is an example of a suitable carbon material. Alternatively, other substrates can include silicon.

The fuel cell further contains a polymer electrolyte membrane. Suitable fuel cell membrane materials, so called ionomers, are known, which are resistant to the reducing environment at the cathode as well as the harsh oxidative environment at the anode. One material is available from DuPont under the trademark Nafion. Other membranes suitable are those based on polybenzimidazole (PBI) doped with phosphoric acid. Any suitable membrane material can be used in the fuel cells of the present invention.

Advantages of the presently disclosed $Pt_3Nb$—$NbO_2$ catalyst when used in a fuel cell include:

Platinum enhanced stability to dissolution due to platinum niobium intermetallic alloy structure and absence of Pt migration to the polymer electrolyte membrane (PEM);

Lower catalyst loading due to higher specific activity of the $Pt_3Nb$—$NbO_2$ catalyst, which can result in lower cost;

Relatively easy synthesis;

Prolonged lifetime of fuel cell due to enhanced durability of catalyst and increased corrosion support stability; and Possible prevention or mitigation of radical formation and subsequent membrane thinning, etc.

In the following examples, $Pt_3Nb$—$NbO_2$ catalyst compositions were synthesized and chemically and electrochemically tested for performance and stability and compared to another Pt-based catalyst. The $Pt_3Nb$—$NbO_2$ catalyst composition, being a very stable chemical substance, demonstrates higher or comparable cathode and anode activity to other Pt catalysts, as well as higher specific activity and remarkable durability, which could considerably prolong fuel cell lifetime, by reducing Pt dissolution levels, and subsequent voltage losses. Additionally, a simple synthesis method was developed, as is illustrated.

The following illustrative examples are intended to be non-limiting. In the following, various analytical techniques were employed.

For the X-ray diffraction data presented, powdered sample X-ray diffraction patterns were obtained and crystallite size was determined by measuring the line broadening of the major peak associated with the phase (i.e. the (111) peak for Pt) and then by calculation using the Scherrer equation.

Electrocatalytic evaluation of the prepared compositions was done using a rotating disk electrode technique on samples both before and after prolonged use as a catalyst. Prolonged use here was accomplished by subjecting samples to square wave cycling (SWC), which involved cycling 1000 times repeatedly for a period of 30 seconds at 0.6 V and then 30 seconds at 1.2 V.

Cyclic voltammograms were obtained before and after this SWC at 100 mV/sec sweep rates from 0.05 to 1.20 volts in 0.1M $HClO_4$ at 30° C. Tafel plots were obtained from 1.0 to 0.8 V at a sweep rate of 2 mV/sec.

In the following, mass activity, in A/g of Pt based on the nominal Pt loading, was determined from ORR curves at 0.9 V. Electrocatalytic surface area in $m^2/g$ of Pt was determined from the appropriate CV curves and corresponds to the Pt area adsorbing hydrogen from 0.05 to 0.4 V and normalized on Pt content. And specific activity, in $A/m^2$ of Pt was determined from ORR curves at 0.9 V.

EXAMPLE 1

Figure 1:
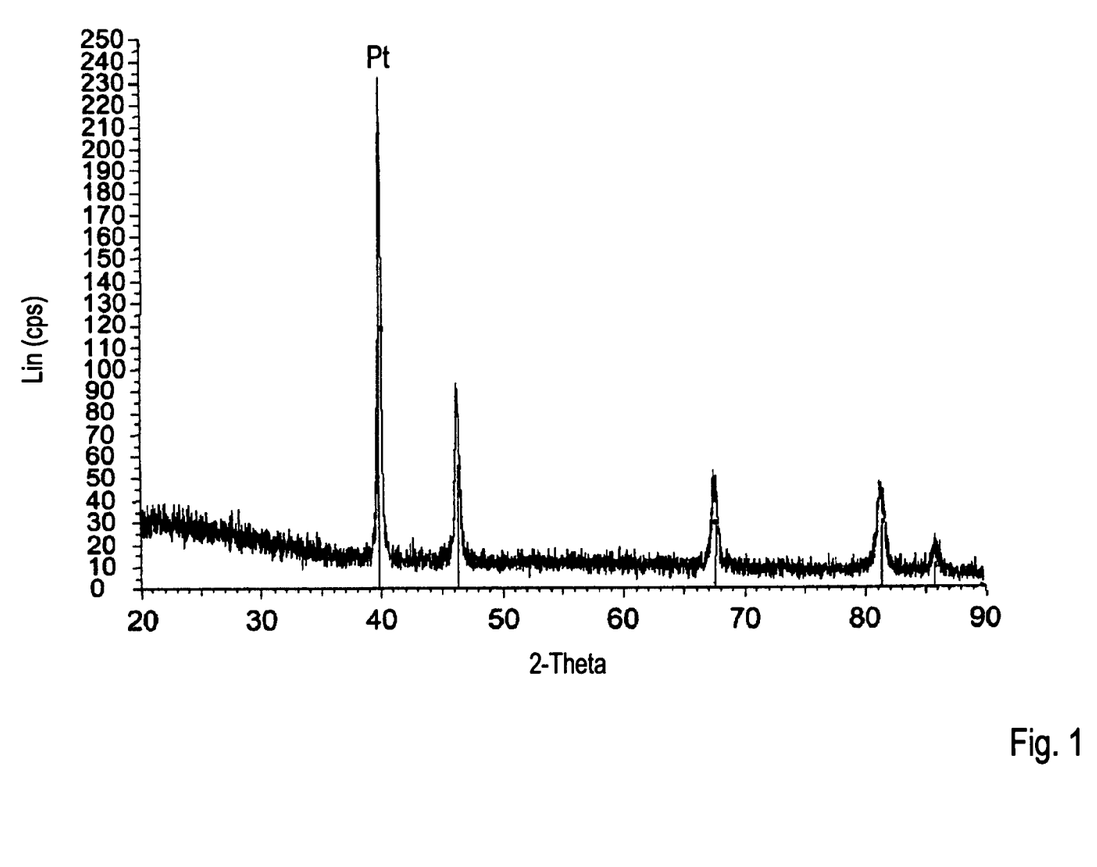
FIG. 1 is an X-Ray Diffraction (XRD) spectrum of the intermediate phase obtained in the preparation of Example 1 and demonstrates only Pt crystalline phase.
Figure 2:
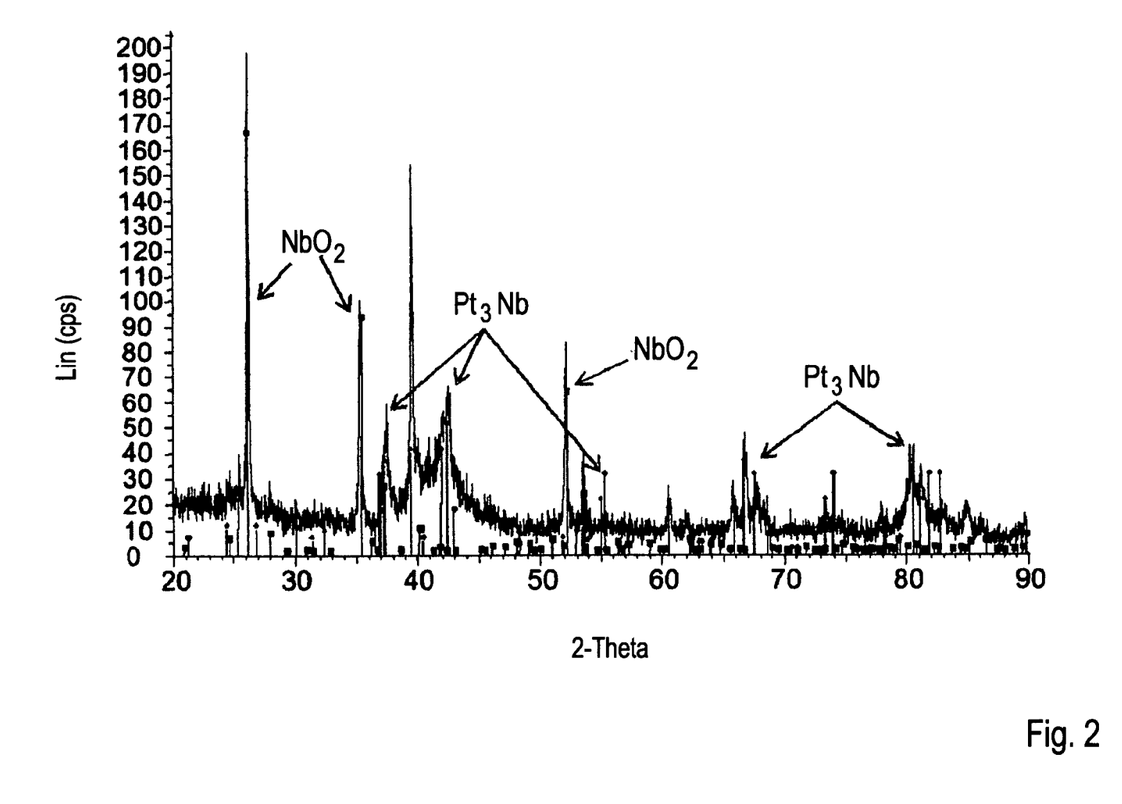
FIG. 2 is an XRD spectrum of the $Pt_3Nb$—$NbO_2$ prepared in Example 1 and demonstrates Pt alloying with Nb and $NbO_2$ formation.

$Pt_3Nb$—$NbO_2$ was prepared by first grinding together 1 mmol of $Nb(HC_2O_4)_5.6H_2O$ (niobium oxalate) and 0.43 mmol of $Pt(NH_3)_4(NO_3)_2$ (tetraamine platinum(II) nitrate) in the presence of 7.5 mmol $NH_4HCO_3$ (ammonium bicarbonate). The ground powder mixture was then heated in an argon atmosphere at 400° C. for 1 hour. The intermediate reaction product here comprised amorphous Nb oxide. An XRD spectrum was taken of this intermediate product and is shown in FIG. 1. The spectrum shows only the presence of Pt crystallites of relatively large size, namely 18-22 nm (as determined from line broadening of the XRD spectrum). No evidence of any crystalline niobium oxide phase was found. The mixture was then heated further in a reducing atmosphere comprising a mixture of hydrogen and argon at 800° C. for 1 hour. During this thermolysis step, both Pt alloying with Nb, and $NbO_2$ semiconductive phase formation occurred. An XRD spectrum of the thermolyzed mixture was taken and is shown in FIG. 2. The spectrum shows crystalline phases for $NbO_2$, $Pt_3Nb$, and some indication of an amount of NbO. From the XRD pattern, the average crystallite sizes for both the $Pt_3Nb$ and the $NbO_2$ phases were determined to be about equal to 30 nm. The synthesized $Pt_3Nb$ intermetallic phase has an orthorhombic structure with the following lattice parameters, Å: a=4.5700, b=5.5400, c=4.8800.

Figure 5:
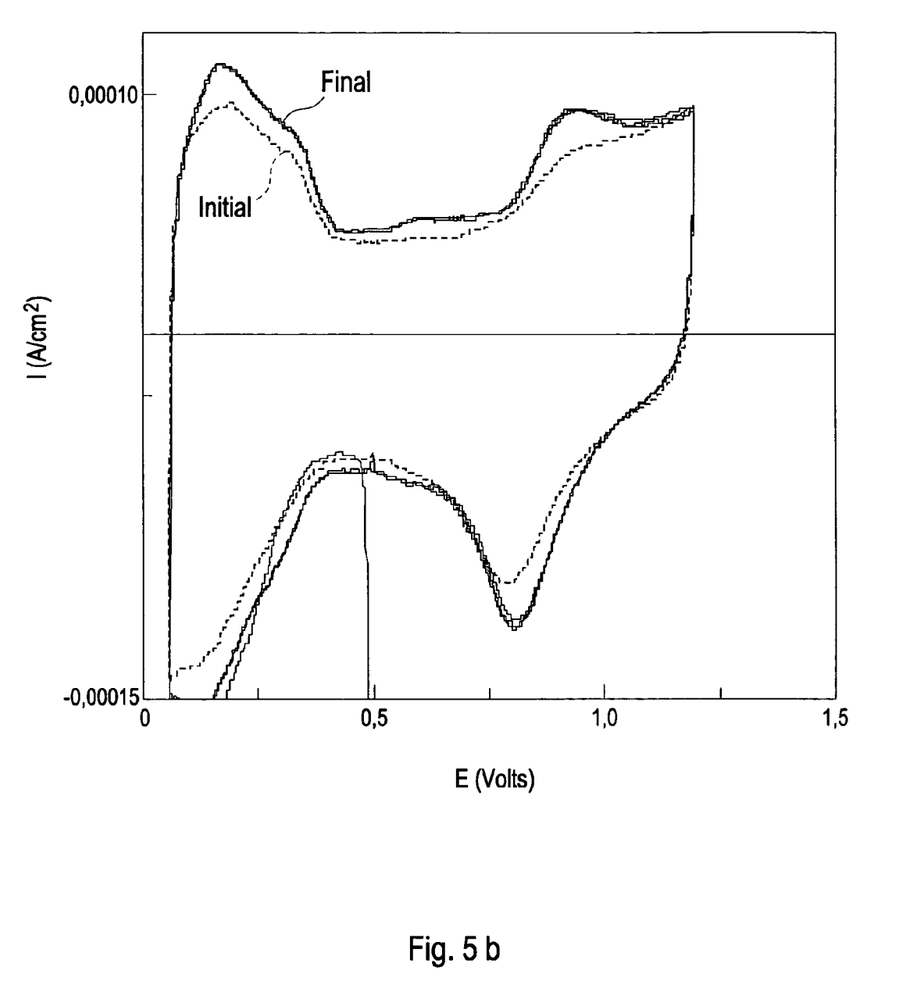
FIGS. 5a and 5b are graphs of initial and final CV curves after square wave cycling (SWC) at 0.6 and 1.2 V for Examples 1 and 2 respectively.
Figure 5A:
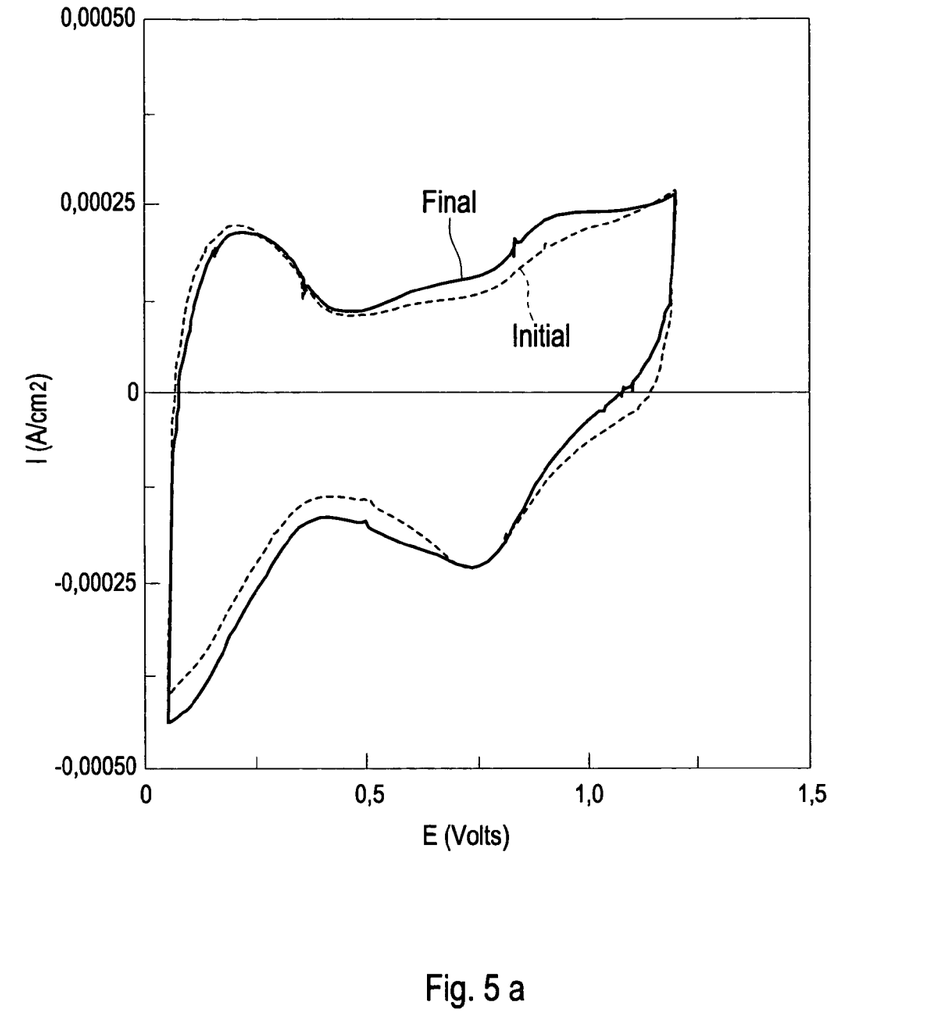
Figure 6:
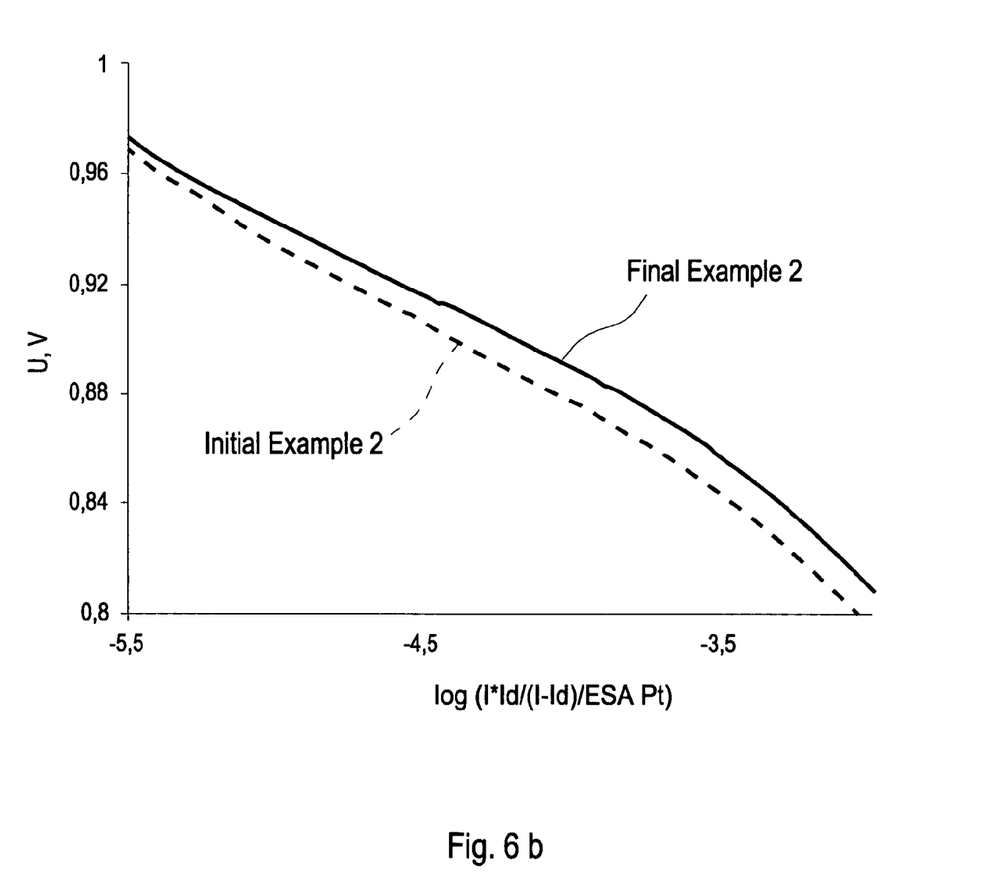
FIG. 6a compares graphs of initial and final Tafel plots of the $Pt_3NbO_2$—$NbO_2$ prepared in Example 1 to that of a commercial carbon supported platinum after SWC at 0.6 and 1.2 V.
FIG. 6b shows graphs of initial and final Tafel plots of the $Pt_3NbO_2$—$NbO_2$ prepared in Example 2 after SWC at 0.6 and 1.2 V.
Figure 6A:
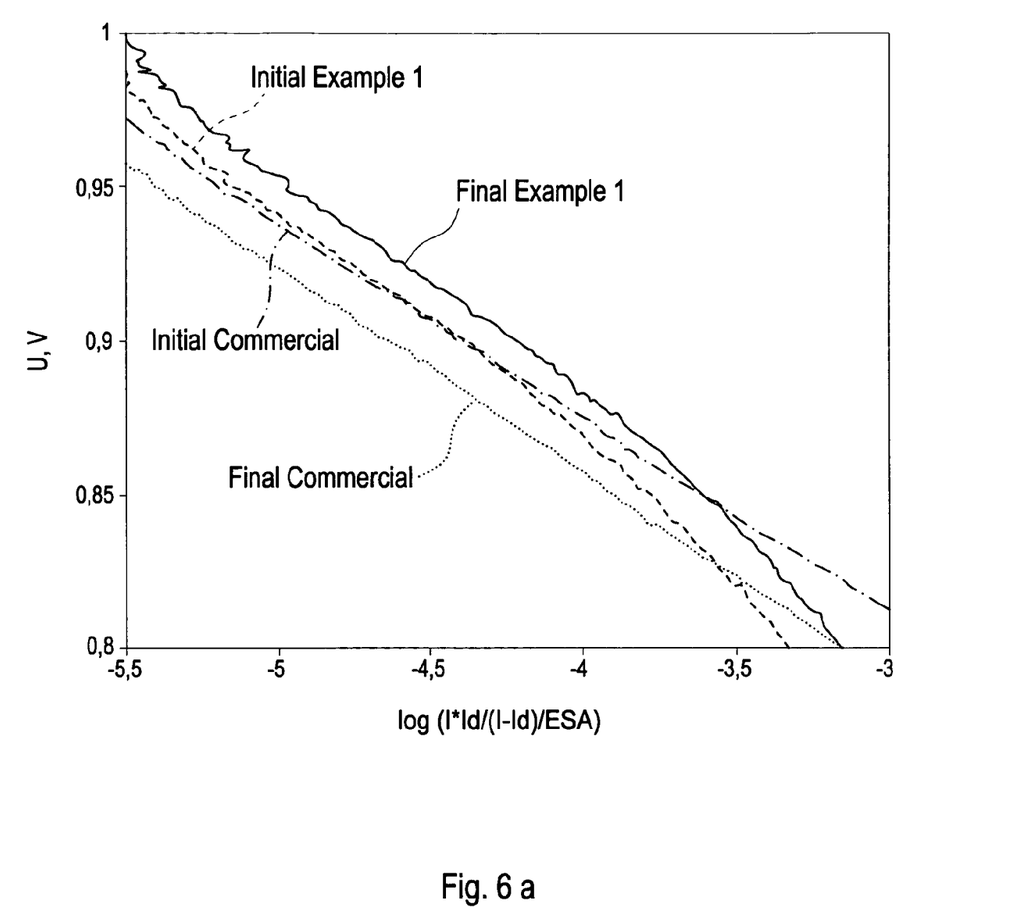

FIG. 5a shows graphs of the initial CV curve and final CV curve after SWC. FIG. 6a compares graphs of the initial Tafel plot and final Tafel plot after SWC of the prepared $Pt_3NbO_2$—$NbO_2$ catalyst composition to those of a commercial carbon supported platinum.

Table 1 below lists the mass activity (MA) and the specific activity (SA) for these samples before SWC, and also lists the % change in each after SWC. The change in electrocatalytic surface area (ESA) is also listed, however the initial ESA has not been calculated and is not presented.

$Pt_3Nb$—$NbO_2$ is more active than Pt itself and more electrochemically stable. Though the absolute mass activity of the prepared $Pt_3NbO_2$—$NbO_2$ was less than the commercial Pt—C tested, it demonstrated higher stability. Moreover, the specific activity and mass activity of the former increased after SWC in the studied potential region. It is expected that the absolute mass activity can be improved by increasing electrochemical surface area by improving $Pt_3Nb$ dispersion and decreasing particle size of electroactive clusters.

TABLE 1

| Sample | Initial MA (A/g) | Initial SA (A/m$^2$) | Change in MA | Change in ESA | Change in SA |
|---|---|---|---|---|---|
| Commercial carbon supported Pt | 5.6 | 0.3 | −40% | 0% | −37% |
| Example 1 | 1.2 | 0.38 | +39% | −15% | +50% |
| Example 2 | 1.6 | 0.39 | +70% | +18% | +49% |

EXAMPLE 2

Figure 3:
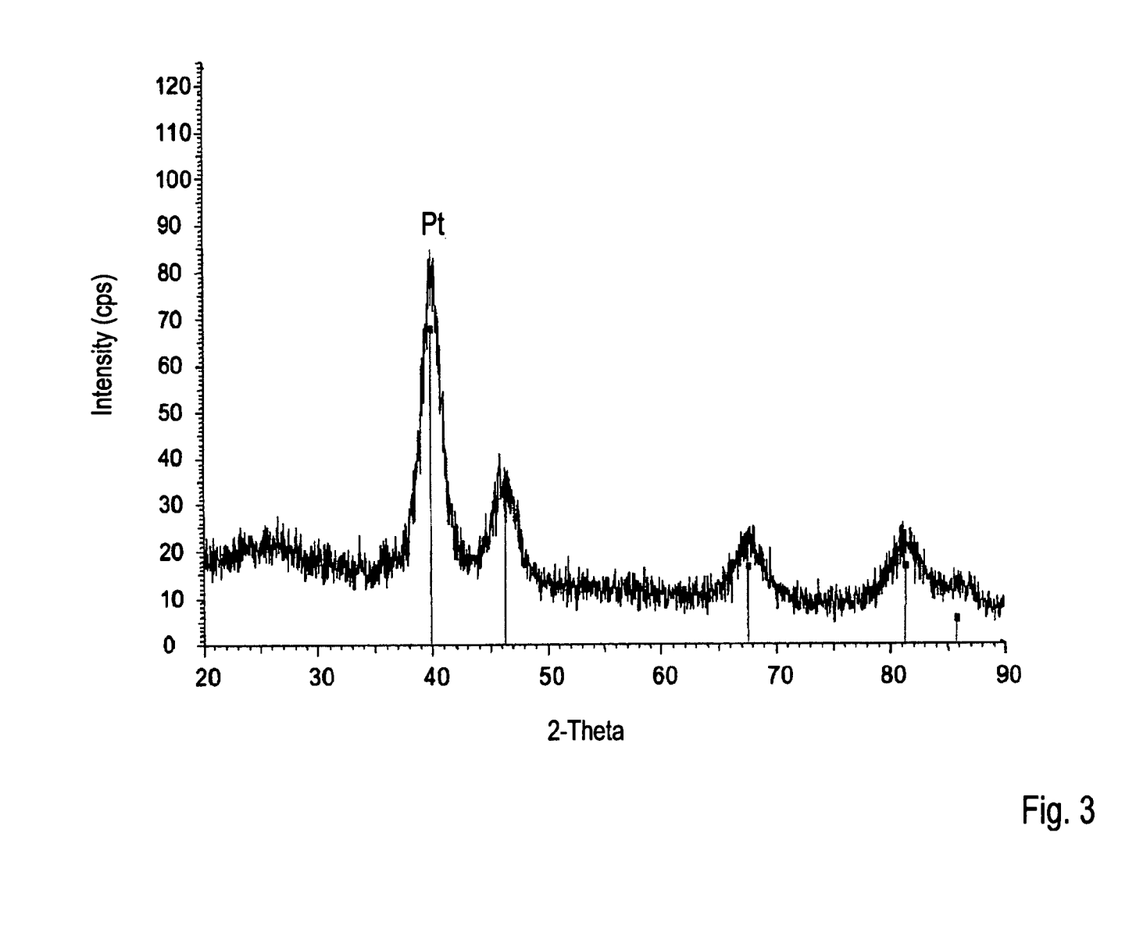
FIG. 3 is an X-Ray Diffraction (XRD) spectrum of the thermolysis mixture obtained in the preparation of Example 2 and demonstrates only Pt crystalline phase.
Figure 4:
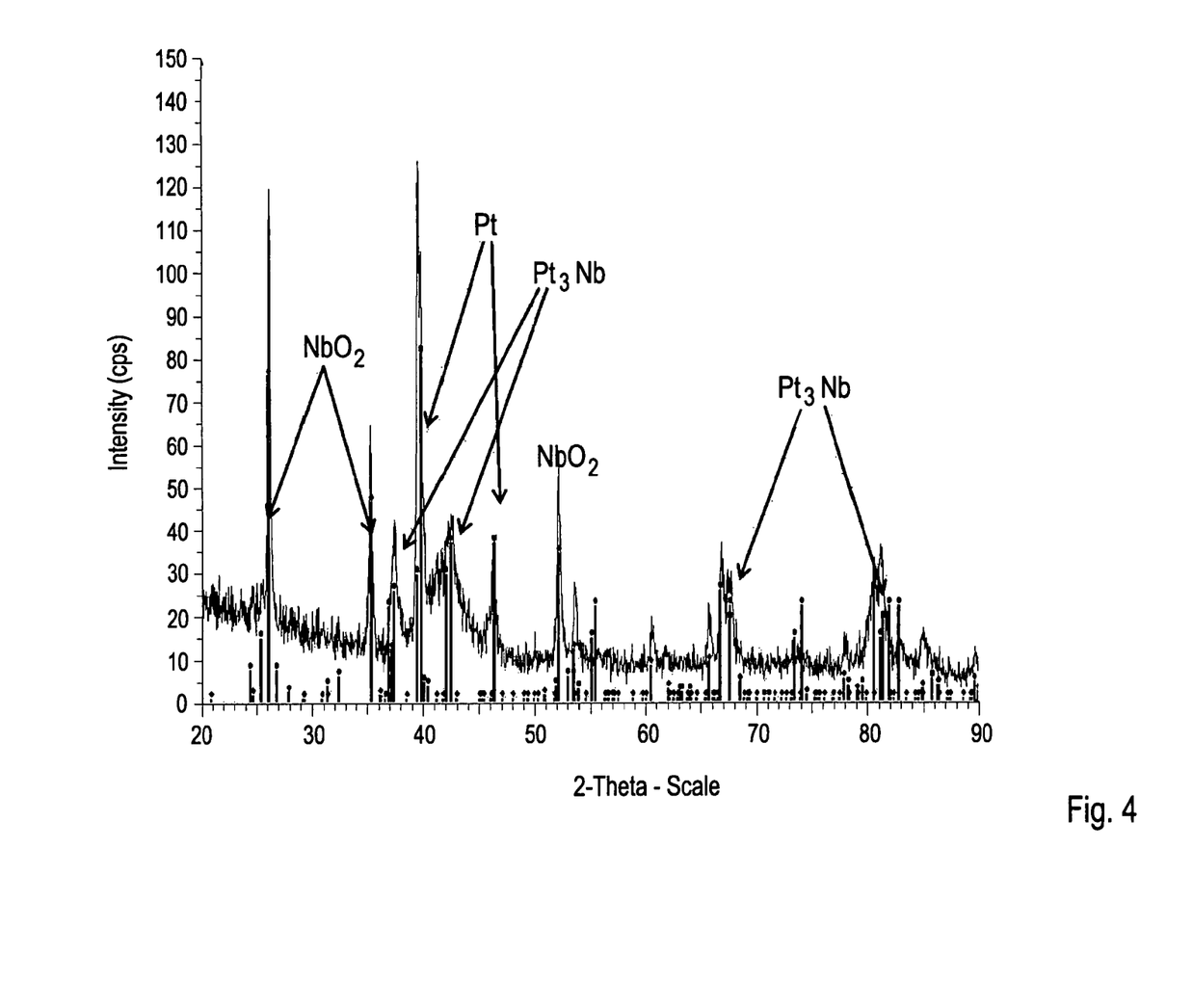
FIG. 4 is an XRD spectrum of the $Pt_3Nb$—$NbO_2$ prepared in Example 1 and demonstrates Pt alloying with Nb and $NbO_2$ formation.

$Pt_3Nb$—$NbO_2$ was prepared in a two step procedure in this Example. Initially, 4 mmol of $Nb(HC_2O_4)_5.6H_2O$ was ground together with 77 mmol $NH_4HCO_3$, but this time without a Pt compound present in this initial stage. The initial mixture was then heated in an argon atmosphere at 400° C. for 1 hour. The product obtained was then decorated with Pt using an alcohol reduction method and 0.64 g of $H_2PtCl_6.6H_2O$ (dihydrogen-hexachloroplatinate(IV) hexahydrate) as the Pt precursor compound. An XRD spectrum was taken of this thermolysis mixture and is shown in FIG. 3. The thermolysis mixture comprises amorphous Nb oxide and small Pt crystallites. The Pt crystallites here are about 4.2 nm in size (as determined from line broadening of the XRD spectrum). Again, no crystalline niobium oxide phase was found. The mixture was then heated further in a reducing atmosphere comprising a mixture of hydrogen and argon at 800° C. for 1 hour. During this thermolysis step, both Pt alloying with Nb, and $NbO_2$ semiconductive phase formation again occurred. An XRD spectrum of the thermolyzed mixture was taken and is shown in FIG. 4. The spectrum shows crystalline phases for $NbO_2$, $Pt_3Nb$, and some elemental Pt. From this XRD pattern, the average crystallite size of the $Pt_3Nb$ was determined to be about equal to 14.9 nm. Again the synthesized $Pt_3Nb$ intermetallic phase has an orthorhombic structure with the following lattice parameters, Å: a=4.5700, b=5.5400, c=4.8800. The average crystallite size of the $NbO_2$ was determined to be about 20.5 nm.

Electrocatalytic evaluation of the catalyst was then performed as in the preceding Example. FIG. 5b shows graphs of the initial CV curve and the final CV curve after SWC. FIG. 6b shows graphs of the initial Tafel plot and the final Tafel plot after SWC of the $Pt_3NbO_2$—$NbO_2$ prepared here. And as for Example 1, the initial values for and changes in mass activity and the specific activity, along with the change in electrocatalytic surface area, are listed in Table 1 above.

The data above demonstrates that $Pt_3Nb$—$NbO_2$ catalyst compositions are very promising for fuel cell applications in terms of stability and durability and for reducing crystallite size of the Pt intermetallic phase.

While various embodiments have been described, it is to be understood that variations and modifications may be resorted to as will be apparent to those skilled in the art. Such variations and modifications are to be considered within the purview and scope of the claims appended hereto.

The invention claimed is:
1. A catalyst composition comprising:
an intermetallic phase comprising Pt and a metal selected from the group consisting of
Nb and Ta; and
a dioxide of the metal.

2. The catalyst composition of claim 1 wherein the average crystallite size of the intermetallic phase is in the range between 0 and 35 nm.

3. The catalyst composition of claim 1 wherein the average crystallite size of the intermetallic phase is in the range between 0 and 15 nm.

4. The catalyst composition of claim 1 wherein the metal is Nb.

5. The catalyst composition of claim 4 wherein the composition is $Pt_3Nb$—$NbO_2$.

6. The catalyst composition of claim 5 wherein the $Pt_3Nb$ intermetallic phase has an orthorhombic structure with lattice parameters a=4.5700 Å, b=5.5400 Å, and c=4.8800 Å.

7. An anode for a fuel cell comprising the catalyst composition of claim 1.

8. A cathode for a fuel cell comprising the catalyst composition of claim 1.

9. A polymer electrolyte membrane fuel cell comprising the catalyst composition of claim 1.

10. A method of making the catalyst composition of claim 1, the method comprising:
    preparing a thermolysis mixture comprising a salt of the metal wherein the metal is in the +5 valence state, a Pt compound, and a basic salt selected to decompose into gaseous byproducts at a thermolysis temperature;
    heating the thermolysis mixture in a reducing atmosphere to the thermolysis temperature wherein the thermolysis temperature is less than 900° C.

11. The method of claim 10 wherein the preparing comprises grinding the thermolysis mixture before the heating.

12. The method of claim 10 wherein the reducing atmosphere comprises hydrogen and an inert gas.

13. The method of claim 10 wherein the thermolysis temperature is about 800° C.

14. The method of claim 10 comprising:
    preparing an initial mixture comprising the salt of the metal and the basic salt;
    and heating the initial mixture in an ambient atmosphere to a temperature below the thermolysis temperature.

15. The method of claim 14 wherein the initial mixture comprises amorphous metal oxide.

16. The method of claim 14 comprising:
    adding the Pt compound to the initial mixture after heating the initial mixture and thereby preparing the thermolysis mixture.

17. The method of claim 10 wherein the metal is Nb and the salt of the metal is selected from the group consisting of: niobium oxalate and niobium chloride.

18. The method of claim 10 wherein the Pt compound is selected from the group consisting of: tetraamine platinum (II) nitrate, tetraamine platinum(II) chloride hydrate, platinum(II) chloride monohydrate, platinum acetylacetonate, diiminedinitrito platinum(II) and dihydrogenhexachloroplatinate(IV) hexahydrate.

19. The method of claim 10 wherein the basic salt is selected from the group consisting of ammonium bicarbonate, ammonium carbonate, ammonium acetate, ammonium oxalate, ammonium sulfate, and ammonium hydroxide.

20. The method of claim 10 wherein the salt of the metal is niobium oxalate, the Pt compound is selected from the group consisting of tetraamine platinum(II) nitrate and dihydrogenhexachloroplatinate(IV) hexahydrate, the basic salt is ammonium bicarbonate, and the catalyst composition made is $Pt_3Nb$—$NbO_2$.

21. The method of claim 20 wherein the atomic ratio of Pt to Nb in the thermolysis mixture is greater than or equal to 0.4.

* * * * *